United States Patent
Schottland et al.

(10) Patent No.: US 6,475,588 B1
(45) Date of Patent: Nov. 5, 2002

(54) COLORED DIGITAL VERSATILE DISKS

(75) Inventors: Philippe Schottland; Verghese Thomas; Sharon S. Weis; Steven R. Peak, all of Evansville, IN (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/682,212

(22) Filed: Aug. 7, 2001

(51) Int. Cl.⁷ .................................................. B32B 3/02

(52) U.S. Cl. ..................... 428/64.1; 428/64.4; 428/64.8

(58) Field of Search ............................... 428/64.1, 64.4, 428/457, 913, 64.8; 430/270.12, 495.1, 945

(56) References Cited

U.S. PATENT DOCUMENTS

| | | |
|---|---|---|
| 3,152,098 A | 10/1964 | Snedeker |
| 3,507,951 A | 4/1970 | Morecroft et al. |
| 3,635,895 A | 1/1972 | Kramer ........................ 260/47 |
| 3,673,146 A | 6/1972 | Factor |
| 3,689,768 A | 9/1972 | Sato et al. |
| 4,001,184 A | 1/1977 | Scott ............................ 260/47 |
| 4,023,185 A | 5/1977 | Bloom et al. |
| 4,049,614 A | 9/1977 | Baron et al. |
| 4,092,288 A | 5/1978 | Calkins et al. |
| 4,097,895 A | 6/1978 | Spong |
| 4,101,907 A | 7/1978 | Bell et al. |
| 4,143,026 A | 3/1979 | Panek et al. |
| 4,190,843 A | 2/1980 | Spong |
| 4,217,438 A | 8/1980 | Brunelle et al. ............ 528/202 |
| 4,218,689 A | 8/1980 | Bloom et al. |
| 4,219,826 A | 8/1980 | Bloom et al. |

(List continued on next page.)

FOREIGN PATENT DOCUMENTS

| | | |
|---|---|---|
| EP | 0004268 | 6/1981 |
| EP | 0101667 | 10/1984 |
| EP | 0 178 836 | 4/1986 |
| EP | 0212411 B1 | 3/1987 |
| EP | 0215322 B1 | 3/1987 |
| EP | 0408271 A2 | 1/1991 |
| EP | 0 438 225 B1 | 10/1996 |
| EP | 1069556 A1 | 1/2001 |
| GB | 963779 | 7/1964 |
| GB | 1195078 | 6/1970 |
| GB | 1502237 | 2/1978 |
| GB | 2005457 A | 4/1979 |
| GB | 1577548 | 10/1980 |
| GB | 1595426 | 8/1981 |
| JP | 55123646 | 9/1980 |
| JP | 55160051 | 12/1980 |
| JP | 56031085 | 3/1981 |
| JP | 56070053 | 6/1981 |

(List continued on next page.)

Primary Examiner—Elizabeth Evans Mulvaney (57) ABSTRACT

A colored optical disk and method for making the same are disclosed herein. The method comprises: disposing a first semi-reflective data layer on a first resin layer, wherein the first resin layer has light transmission at a desired reading wavelength of greater than about 60%; disposing a top side of a first fully reflective data layer on a side of said first semi-reflective data layer opposite said first resin layer, wherein reflectivity of the first fully reflective data layer and the first semi-reflective data layer is individually about 18 to about 30%, and wherein a difference in the reflectivity between the first fully reflective data layer and the first semi-reflective data layer is less than about 5%; disposing a separating layer between said first fully reflective data layer and said first semi-reflective data layer; disposing a second resin layer on a bottom side of said first fully reflective data layer; and adding color to at least a portion of the optical disk.

23 Claims, 3 Drawing Sheets

U.S. PATENT DOCUMENTS

| | | |
|---|---|---|
| 4,241,355 A | 12/1980 | Bloom et al. |
| 4,242,689 A | 12/1980 | Bloom et al. |
| 4,251,425 A | 2/1981 | Ohara et al. |
| 4,271,211 A | 6/1981 | Knepper |
| 4,284,411 A | 8/1981 | Neeff et al. |
| 4,286,957 A | 9/1981 | La Naour-Sene |
| 4,315,269 A | 2/1982 | Bloom et al. |
| 4,332,587 A | 6/1982 | Kressner et al. |
| 4,336,545 A | 6/1982 | Howe et al. |
| 4,377,389 A | 3/1983 | Haddad et al. |
| 4,405,706 A | 9/1983 | Takahashi et al. |
| 4,444,714 A | 4/1984 | Martensen |
| 4,464,487 A | 8/1984 | Thomas et al. |
| 4,477,608 A | 10/1984 | Babler et al. |
| 4,501,876 A | 2/1985 | Zahr |
| 4,640,690 A | 2/1987 | Baumgartner et al. |
| 4,650,823 A | 3/1987 | Krishnan et al. |
| 4,689,086 A | 8/1987 | Naumann et al. |
| 4,709,363 A | 11/1987 | Dirks et al. |
| 4,719,615 A | 1/1988 | Feyrer et al. |
| 4,722,595 A | 2/1988 | Siol |
| 4,732,570 A | 3/1988 | Baumgartner et al. |
| 4,812,141 A | 3/1989 | Baumgartner et al. |
| 4,812,142 A | 3/1989 | Brodmann |
| 4,889,756 A | 12/1989 | Barzynski et al. |
| 4,891,800 A | 1/1990 | Sugaya .................. 369/275 |
| 4,948,715 A | 8/1990 | Hulme-Lowe et al. |
| 4,983,648 A | 1/1991 | Laughner et al. |
| 4,998,239 A | 3/1991 | Strandjord et al. |
| 5,116,547 A | 5/1992 | Tsukahara et al. |
| 5,190,800 A | 3/1993 | Yamada et al. |
| 5,240,464 A | 8/1993 | Kluger et al. |
| 5,307,229 A | 4/1994 | Sata |
| 5,453,100 A | 9/1995 | Sieloff |
| 5,491,029 A | 2/1996 | Evans et al. |
| 5,640,382 A | 6/1997 | Forczak et al. |
| 5,648,197 A | 7/1997 | Kuroda |
| 5,671,205 A | 9/1997 | Ledieu |
| 5,688,447 A | 11/1997 | Hong |
| 5,800,573 A | 9/1998 | Michaelis et al. |
| 5,804,124 A | 9/1998 | Sata |
| 5,820,961 A * | 10/1998 | Maruyama ............... 428/64.1 |
| 5,840,395 A * | 11/1998 | Sawada .................. 428/64.1 |
| 5,894,069 A | 4/1999 | Wen et al. |
| 5,958,087 A | 9/1999 | Liao et al. |
| 6,007,889 A * | 12/1999 | Nee ........................ 428/64.1 |
| 6,022,944 A | 2/2000 | Weaver et al. |
| 6,045,888 A | 4/2000 | Chan et al. |
| 6,099,930 A | 8/2000 | Cyr et al. |
| RE36,902 E | 10/2000 | Eckel et al. |
| 6,177,168 B1 * | 1/2001 | Stevens .................. 428/64.1 |
| 6,214,433 B1 | 4/2001 | Tronche et al. |
| 6,219,329 B1 | 4/2001 | Tanaka et al. .......... 369/275.1 |
| 6,226,109 B1 | 5/2001 | Tompkin et al. |
| 6,245,118 B1 | 6/2001 | Shakhnovich |
| 6,280,808 B1 | 8/2001 | Fields et al. |

FOREIGN PATENT DOCUMENTS

| | | |
|---|---|---|
| JP | 56070054 | 6/1981 |
| JP | 57150152 | 9/1982 |
| JP | 57151644 | 9/1982 |
| JP | 57192458 | 11/1982 |
| JP | 58174438 | 10/1983 |
| JP | 58218055 | 12/1983 |
| JP | 59045195 | 3/1984 |
| JP | 59228712 | 12/1984 |
| JP | 60194720 | 12/1985 |
| JP | 6145437 | 5/1986 |
| JP | 62168119 | 7/1987 |
| JP | 63195838 | 8/1988 |
| JP | 02033742 | 2/1990 |
| JP | 06060422 | 3/1994 |
| JP | 07057300 | 3/1995 |
| JP | 7262606 | 10/1995 |
| JP | 8279188 | 10/1996 |
| JP | 1995000106917 | 10/1996 |
| JP | 9288847 | 11/1997 |
| JP | 9180261 | 10/1998 |
| JP | 11025518 | 1/1999 |
| WO | WO 80/00708 | 4/1980 |
| WO | WO 84/02794 | 7/1984 |
| WO | WO 84/02795 | 7/1984 |
| WO | WO 99/18571 | 4/1999 |

* cited by examiner

FIG. 1

- 13 label
- 1 substrate
- 5 fully reflective data layer
- 11 coating
- 9 glue
- 11 coating
- 3 semireflective data layer
- 5 substrate
- 7 readout surface

DVD — layer 0

FIG. 4

DVD — layer 1, layer 0

FIG. 10

·········· Solvent Blue 97
———— Solvent Violent 13
- - - - Solvent Green 28

COLORED DIGITAL VERSATILE DISKS

BACKGROUND OF INVENTION

This disclosure relates to a data storage media, and especially relates to a colored data storage media.

Digital Versatile Disks (or DVDs) are slowly but surely taking over compact disks (CDs). These formats provide significantly more storage capacity than CDs thus allowing the recording of up to 8 hours of video/audio content with high digital quality. The number of DVDs sold on the market will likely exceed 1 billion units globally in 2001 and is expected to reach about 4 billion by 2004.

To achieve the high storage density in a disk that has the same overall dimensions as a CD, the disk construction has been changed. The most fundamental and visible difference is that a DVD is no longer made of a single 1.2 mm thick plastic substrate but of two 0.6 mm halves that are bonded together ("DVD Demystified:" by Jim Taylor, ed. McGraw Hill, 1998). In addition, the reading laser wavelength has changed from 780 nanometers (nm) in CDs, which is located in the near infrared part of the spectrum, to 635 or 650 nm for DVDs which is located in the visible spectrum.

Depending on the type of DVD (DVD-5, DVD-9, DVD-10, DVD-14, DVD-18, DVD-R, DVD-RW, . . . ), the construction can vary substantially, going from a single side/single layer (DVD-5) to double side/double layer (DVD-18), not to mention the recordable formats such as DVD-R and DVD-RW. The tight specifications (European Association for Standardizing Information and Communication Systems ("ECMA") Specifications #267 for 1.20 mm DVD-Read only disk) imposed by the Optical Media consortium, combined with the fact that the laser wavelength is located in the visible spectrum makes DVD manufacturing a challenge.

The optical properties of the substrate are not the only requirements for DVDs. For example, the size of the pits is much smaller in a DVD, which implies that a DVD is more sensitive to resin quality (impurities) than a CD. Due to their thinner gage (0.6 mm instead of 1.2 mm), DVDs are also more challenging than CDs in terms of molding. In fact, the rheology (flow characteristics) of the resin is important and tightly controlled. Additionally, inconsistencies in the thickness of the disk body are also a source of defects in optical disks. A DVD is much more sensitive to the presence of such defects because it is not only thinner and read in the visible spectrum, but it is also read at a higher rotational/scanning speed than a regular CD. The most advanced DVD formats that are multi-layered (as for example DVD-9, DVD-14 and DVD-18) represent the highest degree of difficulty because of the presence of both a fully reflective and a semi-reflective layer associated with 2 layers of pits (e.g., patterning which forms geographic locators). Single layered DVDS, i.e. DVD-5 and DVD-10, do not have the semi-reflective layer and contain only one layer of pits. As a result of the differences in the disk construction, reflectivity requirements are very different between single layered and multi-layered disks.

To date, all the pre-recorded or recordable multi-layered DVDs available on the market are made with colorless resin. The only aesthetic difference between DVDs comes from the metallization (i.e., the data layer). For example a gold disk is obtained when gold is used, and similarly, a bright silver look is obtained with silver alloy or aluminum.

SUMMARY OF INVENTION

The above-mentioned drawbacks and disadvantages have been overcome and alleviated by the optical disk and method of making the same. The optical disk comprises: a first fully reflective data layer, a first separating layer disposed on a top side of the first fully reflective data layer, a first semi-reflective data layer disposed on a side of the separating layer opposite the first fully reflective data layer, a first resin layer disposed on an upper side the first semi-reflecting data layer opposite the separating layer, and a second resin layer disposed on a bottom side of said first fully reflective data layer; wherein the first resin layer has light transmission at a desired reading wavelength of greater than 60%; wherein a reflectivity of the first fully reflective data layer and the first semi-reflective data layer is individually about 18 to about 30%; wherein a difference in the reflectivity between the first fully reflective data layer and the first semi-reflective data layer is less than about 5%; and wherein at least a portion of the optical disk is colored.

The method for making the optical disk comprises: disposing a first semi-reflective data layer on a first resin layer, wherein the first resin layer has light transmission at a desired reading wavelength of greater than about 60%; disposing a top side of a first fully reflective data layer on a side of said first semi-reflective data layer opposite said first resin layer, wherein reflectivity of the first fully reflective data layer and the first semi-reflective data layer is individually about 18 to about 30%, and wherein a difference in the reflectivity between the first fully reflective data layer and the first semi-reflective data layer is less than about 5%; disposing a second resin layer on a bottom side of said first fully reflective data layer; and adding color to at least a portion of the optical disk.

These and other features will be apparent from the following brief description of the drawings, detailed description, and attached drawings.

BRIEF DESCRIPTION OF DRAWINGS

Referring now to the following Figures, in which.

DETAILED DESCRIPTION

Figure 1:
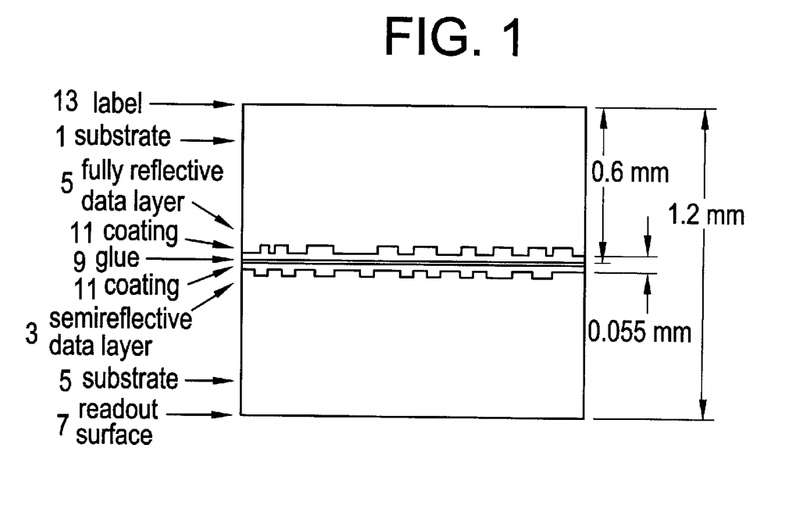
FIG. 1 is a schematic representation of a DVD 9 construction.
Figure 2:
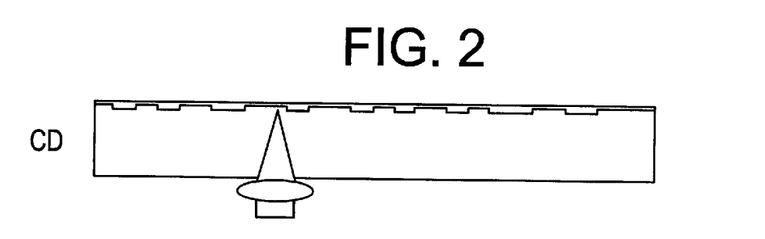
FIG. 2 is a schematic of a CD construction having a single reflective layer disposed at a second side of the substrate.

Referring to FIG. 1, a digital versatile disk (DVD) comprises two bonded plastic substrates (or resin layers) 1 each typically having a thickness less than or equal to about 1.0 mm, with a thickness of less than or equal to about 0.7 mm preferred. At least one substrate comprises one or more layers (e.g., 3, 5), of data. The first layer 3, generally called layer zero (or L0), is closest to the side of the disk from which the data is read (surface 7). The second layer 5, generally called layer 1 (L1), is further from the readout surface 7. Disposed between L0 (3) and L1 (5) is typically an adhesive 9 and optionally a protective coating or separating layer 11. Single sided DVD's (i.e., those that will be read from a single readout surface 7 disposed on one side of the DVD), can additionally comprise a label 13 disposed on the side of the DVD opposite the readout surface 7.

Figure 3:
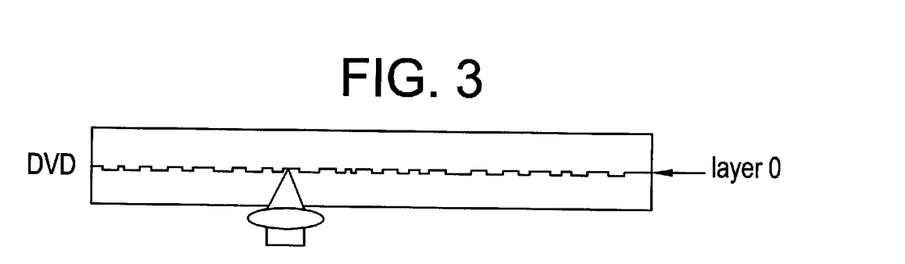
FIG. 3 is a schematic of a DVD construction having a single reflective data layer disposed within the substrate.
Figure 4:
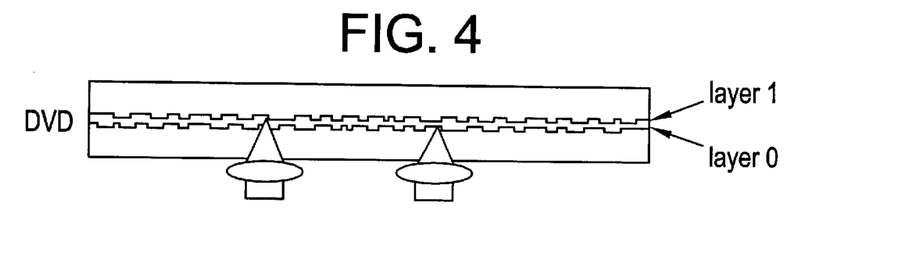
FIG. 4 is a schematic of a DVD construction having two reflective data layers, a semi-reflective data layer and a fully reflective data layer, disposed within the substrate.
Figure 5:
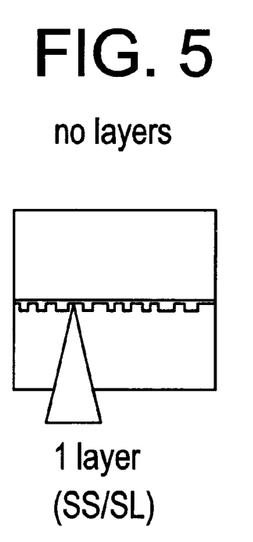
FIG. 5 is a schematic of a DVD construction having a single reflective data layer and a single laser.
Figure 6:
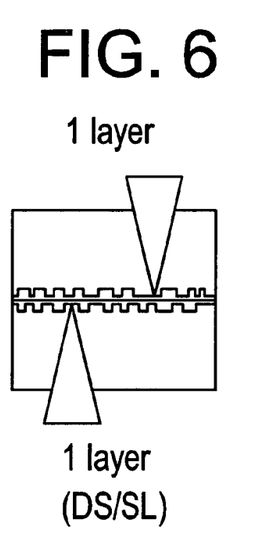
FIG. 6 is a schematic of a DVD construction having two reflective data layers, both disposed on opposite sides of the center of the substrate, and each readable from different sides of the substrate.
Figure 7:
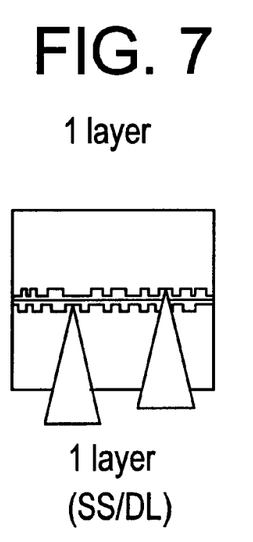
FIG. 7 is a schematic of a DVD construction having two reflective data layers, both disposed on opposite sides of the center of the substrate, and both readable from the same side of the substrate.
Figure 8:
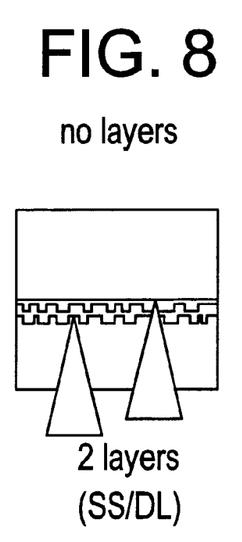
FIG. 8 is a schematic of a DVD construction having two reflective data layers, both disposed on the same side of the center of the substrate, and both readable from the same side of the substrate.
Figure 9:
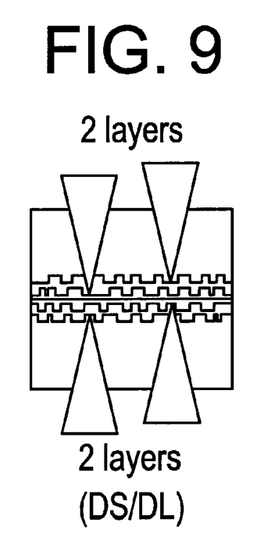
FIG. 9 is a schematic of a DVD construction having four reflective data layers, two disposed on each side of the center of the substrate, and two readable from each side of the substrate.

In the case of a single layer read from a readout surface 7 (e.g. DVD 5, DVD 10), a stamped surface is covered with a thin reflective data layer by a sputtering or other deposition process. This creates a metallic coating typically about 60 to about 100 angstroms (Å) thick. (See FIGS. 3, 5, and 6) For two data layer DVDs that are read from the same readout surface 7 (e.g. DVD 9, DVD 14, DVD 18), the laser must be able to reflect from the first layer 3 when reading it, but also focus (or transmit) through the first layer 3 when reading the second layer 5. (See FIGS. 4, 7, 8, and 9; DVD 9, DVD 9, DVD 14, DVD 18, respectively) Therefore, the first layer 3 is "semi-transparent" (i.e., semi-reflective), while the second layer 5 is "fully-reflective". Under current standards set by the Consortium for Optical Media, metallization combination for the fully-reflective and semi-reflective data layers, as measured per the electrical parameter R14H (as described in ECMA specifications #267), should be about 18 percent (%) to about 30% at the wavelength of the laser. In the present DVD's, the laser wavelength generally employed is less than or equal to about 700 nm, with about 400 nm to about 675 nm preferred, and about 600 nm to about 675 nm more preferred. Although these metallization standards were set for DVD data layers employed with colorless, optical quality resin, they are equally applied to DVD systems with colored resin.

When color is added to the resin, light transmission through and reflected from the substrate is effected. The metallization nature and thickness on the semi-reflective and fully reflective (L0 (3) and L1 (5)) layers is adapted for the light transmission of the substrate. Desired reflectivity can be obtained by balancing the metallization thickness with the reflectivity of the semi-reflective data layer 3, and by adjusting the thickness of the fully reflective data layer 5 to ensure its reflectivity is within the desired specification.

Metallization for the individual data layer(s) can be obtained using various reflective materials. Materials, e.g., metals, alloys, and the like, having sufficient reflectivity to be employed as the semi-reflective and/or fully reflective data layers, and which can preferably be sputtered onto the substrate, can be employed. Some possible reflective materials comprise gold, silver, platinum, silicon, aluminum, and the like, as well as alloys and combinations comprising at least one of the foregoing materials. For example, the first/second reflective data layer metallization can be gold/aluminum, silver alloy/aluminum, silver alloy/silver alloy, or the like.

In addition to the overall reflectivity of each layer 3,5, the difference in reflectivity between subsequent reflective data layers (e.g., layers 3,5) should be controlled, in order to ensure sufficient reflectivity of the subsequent layer. Preferably, the difference in reflectivity between subsequent layers (e.g., the first and second layers 3,5,) is less than or equal to about 5%, with less than or equal to about 4% preferred, and less than or equal to about 3.0% more preferred. It is further preferred to have a reflectivity difference between the adjacent reflective data layers 3,5, of greater than or equal to about 0.5%, with greater than or equal to about 1% more preferred. It should be noted that although described in relation to two layers, it is understood that more than two layers could be employed, and that the difference in reflectivity between subsequent layers should be as set forth above.

The reflective data layers are typically sputtered or otherwise disposed on a pattern (e.g., surface features such as pits, grooves, asperities, start/stop orientor, and/or the like) formed into a surface of the substrate via molding, embossing, or the like. Depositions, for example, can comprise sputtering a semi-reflective data layer over a first patterned surface. A separator layer or protective coating can then be disposed over the semi-reflective data layer. If a multiple data layer DVD (e.g., DVD 14, DVD 18, or the like) is to be formed, a $2^{nd}$ patterned surface can be formed (e.g., stamped or the like) in the side of the separator layer opposite the semi-reflective data layer. A fully reflective data layer can then be sputtered or otherwise deposited on the separator layer. Alternatively, for DVD 14 construction, the fully reflective data layer can be deposited on a patterned surface of a $2^{nd}$ substrate (or resin layer). A separate layer or protective coating is then disposed on one or both of the semi-reflective data layer and the fully reflective data layer. A bonding agent or adhesive can then be disposed between the 2 substrates and they can be bonded together to form a disk as illustrated in FIGS. 3–9. Optionally, several semi-reflective data layers can be deposited with a separator layer between each subsequent layer.

The reflectivity of the reflective data layer(s) can be about 5% to about 100%, depending upon the number of reflective layers. If a single reflective data layer is employed, the reflectivity is preferably about 30% to about 100%, with about 35% to about 90% more preferred, and about 45% to about 85% even more preferred. If a dual reflective data layer is employed, the reflectivity of the data layers is preferably about 5% to about 45%, with about 10% to about 40% more preferred, about 15% to about 35% even more preferred, and about 18% to about 30% especially preferred. Finally, if multiple reflective data layers (e.g., greater than 2 reflective data layers readable from a single reading surface) are employed, the reflectivity is preferably about 5% to about 30%, with about 5% to about 25% more preferred. The especially preferred ranges are currently based upon the ECMA specification #267, wherein the reflectivity is either about 18% to about 30% reflectivity for a dual layered DVD (e.g., at least one fully reflective layer and at least one semi-reflective layer) or about 45% to about 85% reflectivity for a single layer DVD (e.g., one fully reflective layer).

The substrate can comprise any optical quality plastic, e.g., any plastic which enables the transmission of greater than or equal to about 60% of light therethrough, in the wavelength region of the laser. Preferably, the transmissivity is greater than or equal to about 65%, with greater than or equal to about 75% more preferred, and greater than or equal to about 85% especially preferred. The plastic substrate can comprise a resin such as an amorphous, crystalline, or semi-crystalline thermoplastic, a thermoset, or a combination comprising at least one of the foregoing plastics. Some possible plastics include polyetherimides, polyetheretherketones, polyimides, polyvinyl chloride, polyolefins (including, but not limited to, linear and cyclic polyolefins and including polyethylene, chlorinated polyethylene, polypropylene, and the like), polyesters (including, but not limited to, polyethylene terephthalate, polybutylene terephthalate, polycyclohexylmethylene terephthalate, and the like), polyamides, polysulfones (including, but not limited to, polyethersulfones, polyetherethersulfones, hydrogenated polysulfones, and the like), polyimides, polyether imides, polyether sulfones, polyphenylene sulfides, polyether ketones, polyether ether ketones, ABS resins, polystyrenes (including, but not limited to, hydrogenated polystyrenes, syndiotactic and atactic polystyrenes, polycyclohexyl ethylene, styrene-co-acrylonitrile, styrene-co-maleic anhydride, and the like), polybutadiene, polyacrylates (including, but not limited to, polymethylmethacrylate, methyl methacrylate-polyimide copolymers, and the like), polyacrylonitrile, polyacetals, polycarbonates, polyphenylene ethers (including, but not limited to, those derived from 2,6-dimethylphenol and copolymers with 2,3,6-trimethylphenol, and the like), ethylene-vinyl acetate copolymers, polyvinyl acetate, liquid crystal polymers, ethylene-tetrafluoroethylene copolymer, aromatic polyesters, polyvinyl fluoride, polyvinylidene fluoride, polyvinylidene chloride, tetrafluoroethylene fluorocarbon copolymers (e.g., Teflons), epoxy, phenolic, alkyds, polyester, polyimide, polyurethane, polysiloxanes, polysilanes, bis-maleimides, cyanate esters, vinyl, and benzocyclobutene resins, in addition to blends, copolymers, mixtures, reaction products and composites comprising at least one of the foregoing plastics. Preferably, the substrate comprises polycarbonate, with a primarily polycarbonate (e.g., greater than or equal to about 80% polycarbonate) substrate especially preferred.

As used herein, the terms "polycarbonate", "polycarbonate composition", and "composition comprising aromatic carbonate chain units" includes compositions having structural units of the formula (I):

(I)

in which at least about 60 percent of the total number of $R^1$ groups are aromatic organic radicals and the balance thereof are aliphatic, alicyclic, or aromatic radicals. Preferably, $R^1$ is an aromatic organic radical and, more preferably, a radical of the formula (II):

(II)

wherein each of $A^1$ and $A^2$ is a monocyclic divalent aryl radical and $Y^1$ is a bridging radical having one or two atoms-which separate $A^1$ from $A^2$. In an exemplary embodiment, one atom separates $A^1$ from $A^2$. Illustrative, non-limiting examples of radicals of this type are —O—, —S—, —S(O)—, —S(O$_2$)—, —C(O)—, methylene, cyclohexyl-methylene, ethylidene, isopropylidene, neopentylidene, cyclohexylidene, cyclopentadecylidene, cyclododecylidene, and adamantylidene. The bridging radical $Y^1$ can be a hydrocarbon group or a saturated hydrocarbon group such as methylene, cyclohexylidene or isopropylidene.

Polycarbonates can be produced by the interfacial reaction of dihydroxy compounds in which only one atom separates $A^1$ and $A^2$. As used herein, the term "dihydroxy compound" includes, for example, bisphenol compounds having general formula (III) as follows:

(III)

wherein $R^a$ and $R^b$ each represent a halogen atom or a monovalent hydrocarbon group and may be the same or different; p and q are each independently integers from 0 to 4; and $X^a$ represents one of the groups of formula (IV):

(IV)

wherein $R^c$ and $R^d$ each independently represent a hydrogen atom or a monovalent linear or cyclic hydrocarbon group and $R^e$ is a divalent hydrocarbon group.

Some illustrative, non-limiting examples of suitable dihydroxy compounds include dihydric phenols and the dihydroxy-substituted aromatic hydrocarbons disclosed by name or formula (generic or specific) in U.S. Pat. No. 4,217,438. A nonexclusive list of specific examples of the types of bisphenol compounds that may be represented by formula (III) includes the following: 1,1-bis(4-hydroxyphenyl) methane; 1,1-bis(4-hydroxyphenyl) ethane; 2,2-bis(4-hydroxyphenyl) propane (hereinafter "bisphenol A" or "BPA"); 2,2-bis(4-hydroxyphenyl) butane; 2,2-bis(4-hydroxyphenyl) octane; 1,1-bis(4-hydroxyphenyl) propane; 1,1-bis(4-hydroxyphenyl) n-butane; bis(4-hydroxyphenyl) phenylmethane; 2,2-bis(4-hydroxy-1-methylphenyl) propane; 1,1-bis(4-hydroxy-t-butylphenyl) propane; bis (hydroxyaryl) alkanes such as 2,2-bis(4-hydroxy-3-bromophenyl) propane; 1,1-bis(4-hydroxyphenyl) cyclopentane; and bis (hydroxyaryl) cycloalkanes such as 1,1-bis(4-hydroxyphenyl) cyclohexane; and the like, as well as combinations comprising at least one of the foregoing compounds.

It is also possible to employ polycarbonates resulting from the polymerization of two or more different dihydric phenols or a copolymer of a dihydric phenol with a glycol or with a hydroxy- or acid-terminated polyester or with a dibasic acid or with a hydroxy acid or with an aliphatic diacid in the event a carbonate copolymer rather than a homopolymer is desired for use. Generally, useful aliphatic diacids have from 2 to about 40 carbons. A preferred aliphatic diacid is dodecandioic acid. Polyarylates and polyester-carbonate resins or their blends can also be employed. Branched polycarbonates are also useful, as well as blends of linear polycarbonate and a branched polycarbonate. The branched polycarbonates may be prepared by adding a branching agent during polymerization.

These branching agents may comprise polyfunctional organic compounds containing at least three functional groups which may be hydroxyl, carboxyl, carboxylic anhydride, haloformyl, and mixtures comprising at least one of the foregoing groups. Specific examples include trimellitic acid, trimellitic anhydride, trimellitic trichloride, tris-p-hydroxy phenyl ethane, isatin-bis-phenol, tris-phenol TC (1,3,5-tris((p-hydroxyphenyl)isopropyl)benzene), tris-phenol PA (4(4(1,1-bis(p-hydroxyphenyl)-ethyl) alpha, alpha-dimethyl benzyl)phenol), 4-chloroformyl phthalic anhydride, trimesic acid and benzophenone tetracarboxylic acid, and the like. The branching agents may be added at a level of about 0.05 to about 2.0 weight percent, based upon the total weight of the resin. Branching agents and procedures for making branched polycarbonates are described in U.S. Pat. Nos. 3,635,895 and 4,001,184. All types of polycarbonate end groups are herein contemplated.

Preferred polycarbonates are based on bisphenol A, in which each of $A^1$ and $A^2$ is p-phenylene and $Y^1$ is isopropylidene. Preferably, the weight average molecular weight of the polycarbonate is about 5,000 to about 100,000, more preferably about 10,000 to about 65,000, and most preferably about 15,000 to about 35,000.

In monitoring and evaluating polycarbonate synthesis, it is of particular interest to determine the concentration of Fries product present in the polycarbonate. As noted, the generation of significant Fries product can lead to polymer branching, resulting in uncontrollable melt behavior. As used herein, the terms "Fries" and "Fries product" denote a repeating unit in polycarbonate having the formula (V):

(V)

wherein $X^a$ is a bivalent radical as described in connection with formula (III) described above.

The polycarbonate composition may also include various additives ordinarily incorporated in resin compositions of this type. Such additives are, for example, fillers or reinforcing agents; heat stabilizers; antioxidants; light stabilizers; plasticizers; antistatic agents; mold releasing agents; additional resins; blowing agents; and the like, as well as combinations comprising at least one of the foregoing additives. Examples of fillers or reinforcing agents include glass fibers, asbestos, carbon fibers, silica, talc and calcium carbonate. Examples of heat stabilizers include triphenyl phosphite, tris-(2,6-dimethylphenyl)phosphite, tris-(mixed mono-and dinonylphenyl)phosphite, dimethylbenzene phosphonate and trimethyl phosphate. Examples of antioxidants include octadecyl-3-(3,5-di-tert-butyl-4-hydroxyphenyl) propionate, and pentaerythrityl-tetrakis[3-(3,5-di-tert-butyl-4-hydroxyphenyl) propionate]. Examples of light stabilizers include 2-(2-hydroxy-5-methylphenyl) benzotriazole, 2-(2-hydroxy-5-tert-octylphenyl)-benzotriazole and 2-hydroxy-4-n-octoxy benzophenone. Examples of plasticizers include dioctyl-4,5-epoxy-hexahydrophthalate, tris-(octoxycarbonylethyl)isocyanurate, tristearin and epoxidized soybean oil. Examples of the antistatic agent include glycerol monostearate, sodium stearyl sulfonate, and sodium dodecylbenzenesulfonate. Examples of mold releasing agents include stearyl stearate, beeswax, montan wax and paraffin wax. Examples of other resins include but are not limited to polypropylene, polystyrene, polymethyl methacrylate, and polyphenylene oxide. Combinations of any of the foregoing additives may be used. Such additives may be mixed at a suitable time during the mixing of the components for forming the composition.

In addition to the polymer and coloring material, the composition may optionally include various additives ordinarily incorporated in resin compositions of this type. Such additives may include UV absorbers; stabilizers, such as light and thermal stabilizers (e.g., acidic phosphorous-based compounds); hindered phenols; zinc oxide, zinc sulfide particles, or combination thereof; lubricants (mineral oil, and the like); plasticizers; antioxidants; anti-static agents (tetra alkylammonium benzene sulfonate salts, tetra alkylphosphonium benzene sulfonate salts, and the like); mold releasing agents (pentaerythritol tetrastearate; glycerol monstearate, and the like); and the like, and combinations comprising at least one of the foregoing additives. For example, the substrate can comprise about 0.01 weight percent wt % to about 0.1 wt % heat stabilizer; about 0.01 wt % to about 0.2 wt % antistatic agent; and about 0.1 wt % to about 1 wt % mold releasing agent; based upon the total weight of the polymer.

Some possible antioxidants include, for example, organophosphites, e.g., tris (nonyl-phenyl)phosphite, tris(2, 4-di-t-butylphenyl)phosphite, bis(2,4-di-t-butylphenyl) pentaerythritol diphosphite, distearyl pentaerythritol diphosphite and the like; alkylated monophenols, polyphenols and alkylated reaction products of polyphenols with dienes, such as, for example, tetrakis[methylene (3,5-di-tert-butyl-4-hydroxyhydrocinnamate)]methane, 3,5-di-tert-butyl-4-hydroxyhydrocinnamate octadecyl, 2,4-di-tert-butylphenyl phosphite, and the like; butylated reaction products of para-cresol and dicyclopentadiene; alkylated hydroquinones; hydroxylated thiodiphenyl ethers; alkylidene-bisphenols; benzyl compounds; esters of beta-(3,5-di-tert-butyl-4-hydroxyphenyl)-propionic acid with monohydric or polyhydric alcohols; esters of beta-(5-tert-butyl-4-hydroxy-3-methylphenyl)-propionic acid with monohydric or polyhydric alcohols; esters of thioalkyl or thioaryl compounds, such as, for example, distearylthiopropionate, dilaurylthiopropionate, ditridecylthiodipropionate, and the like; amides of beta-(3,5-di-tert-butyl-4-hydroxyphenyl)-propionic acid; and the like, as well as combinations comprising at least one of the foregoing antioxidants.

In order to aid in the processing of the polymer, particularly polycarbonate, catalyst(s) may also be employed, namely in the extruder or other mixing device. The catalyst typically assists in controlling the viscosity of the resulting material. Possible catalysts include hydroxides, such as tetraalkylammonium hydroxide, tetraalkylphosphonium hydroxide, and the like, with diethyldimethylammonium hydroxide and tetrabutylphosphonium hydroxide preferred. The catalyst(s) can be employed alone or in combination with quenchers such as acids, such as phosphoric acid, and the like. Additionally, water may be injected into the polymer melt during compounding and removed as water vapor through a vent to remove residual volatile compounds.

The polymer is produced by using a reaction vessel capable of adequately mixing various precursors, such as a single or twin screw extruder, kneader, blender, or the like. The polymer is then formed, via a molding, extrusion, rolling, stamping, or similar techniques, into a substrate.

Adjacent substrates are attached together with an adhesive or bonding agent (e.g., separator or bonding layer). Any bonding agent having the desired optical qualities can be employed. Some possible bonding agents include glue (e.g., hot glue), acrylic resin (e.g., ultra-violet (UV) curable acrylic resin, with transparent (i.e., greater than or equal to UV curable acrylic resin preferred), and the like, as well as combinations comprising at least one of the foregoing bonding agents.

As with the bonding agent, the separating layer can comprise a transparent material. Some possible separating layers include UV curable transparent resins. Typically, the separating (bonding) layer is up to or exceeding several hundreds of micrometers (μm) thick, with a thickness of less than or equal to about 100 μm useful, and a thickness of about 40 μm to about 70 μm typically employed with current DVD formats.

The color can be added to the DVD by incorporating colorant into the substrate (e.g., the resin layer), the separator layer(s), a top coat, or any combination comprising at least one of the foregoing layers. The coloring of the disk can be obtained in several ways, e.g., using a pre-colored resin for the substrate(s) and/or separating layer(s), mixing a colorless resin and a color concentrate at the molding machine, and using liquid or powder coloring. Whether the colorants are introduced by feeding during the extrusion process, by physical mixing of colorless pellets with a color concentrate before molding, or by liquid or powder coloring at the molding machine, the colorant and its concentration are chosen to meet the DVD specifications. Even when colorant is employed, transparency of the substrate (e.g., greater than or equal to about 60% transparency at the reading wavelength) is maintained in order to attain a bootable DVD.

Transparency of the substrate is directly related to the amount of scattering particles present in the substrate and their size. If they are significantly smaller than the visible wavelength, scattering will not be noticeable. Since the colorants can be a major source of scattering particles, the colorant is preferably filtered, with melt filtering especially preferred, e.g., during adding in the extrusion process. Preferably, the size of the filtered colorant particles (and aggregates thereof) is less than or equal to about 200 nanometers (nm), with a particle (and aggregate) size of less than or equal to about 50 nm preferred.

Colorants are also preferably selected so that they solubilize in the material used to form the layer in which the colorant is disposed. Colorants that are soluble in the materials used for DVD layers include dyes (e.g., "solvent dyes"), organic colorants, pigments, and the like, which behave like dyes; i.e., colorants that disperse in the plastic and do not form aggregates having a size greater than or equal to about 200 nm, with an aggregate size less than or equal to about 50 nm preferred. Some suitable colorants include, but are not limited to, those of the chemical family of anthraquinones, perylenes, perinones, indanthrones, quinacridones, xanthenes, oxazines, oxazolines, thioxanthenes, indigoids, thioindigoids, naphtalimides, cyanines, xanthenes, methines, lactones, coumarins, bisbenzoxaxolylthiophenes (BBOT), napthalenetetracarboxylic derivatives, monoazo and disazo pigments, triarylmethanes, aminoketones, bis(styryl)biphenyl derivatives, and the like, as well as combinations comprising at least one of the foregoing colorants.

Factors in determining the plastic/colorant combination and the amount of colorant employed are currently based upon the above mentioned DVD specifications (EMCA Specifications #267). In order to obtain a semi-reflective data layer and a fully reflective data layer reflectivity within specifications (about 18% to about 30%) for a colored multi-layered DVD, the light transmission and colorant concentration are balanced. The light transmission through the substrate (i.e., DVD half) at the DVD readback laser wavelength is preferably greater than or equal to about 60%. The colorant loading, as well as colorant nature (e.g., the shape of the spectral transmission curve), are dependent on the target color and light transmissivity.

Figure 10:
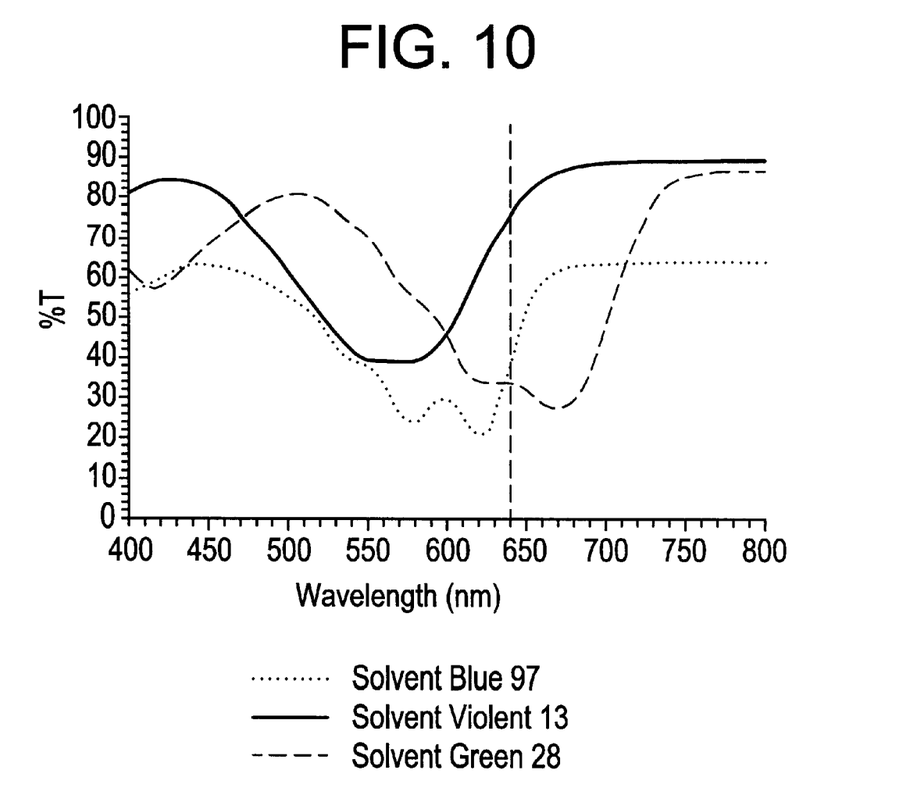
FIG. 10 is a graphical illustration of light transmission of several colorants in 1.2 mm polycarbonate substrate at a loading of 0.014 weight percent.

FIG. 10 illustrates the different light transmission of some common plastic colorants (Solvent Violet 13, Solvent Blue 97 and Solvent Green 28). The colorant that has the lower absorptivity at the desired wavelength, e.g., at 650 nm, therefore exhibits the maximum transmission at this wavelength and is preferred. Selection of colorants with high absorptivity at the desired wavelength limits the maximum colorant loading possible to yield a functional multi-layered DVD. Since colorants with a lower absorptivity at the desired wavelength can be used at higher loadings in the formulation it becomes easier to obtain the target color in a functional disk. For instance, Solvent Violet 13 is preferred over Solvent Blue 97 when trying to achieve a blue color because of its lower absorptivity at 650 nm.

Typically, the colorant loading is greater than or equal to about 0.000001 weight percent (wt %), with greater than or equal to about 0.00001 wt % preferred, greater than or equal to about 0.0001 wt % more preferred, and greater than or equal to about 0.001 wt % even more preferred, based upon the total weight of the layer comprising the colorant (e.g., the substrate, separator layer, or top coat). It is further preferred to employ colorant in an amount of less than or equal to about 0.5 wt %, with less than or equal to about 0.05 wt % preferred, and less than or equal to about 0.005 wt % more preferred.

In addition to the reflective layers and separator layer(s), layers such as protective layer(s) (e.g., lacquers, and the like), ultra-violet (UV) inhibitor layer(s), moisture barrier layer(s), ductility layer(s), and the like, as well as combinations comprising at least one of these layers, can be employed.

The disclosure is further illustrated by the following non-limiting examples.

The following resin compositions (A to H) have been used to manufacture multi-layered DVD (DVD-9). All of the samples comprised a substrate comprising 100 parts of polycarbonate resin having a weight average molecular weight (Mw) of 17,700, 0.02 parts of bis(2,4-dicumylphenyl)pentaerythrytol diphosphite, and 0.03 parts of glycerol monostearate, based upon the total weight of the substrate. The additional components of the substrate are set forth in Table I. All amounts are in parts by weight, based upon the total weight of the substrate.

[t1]

TABLE I

| Component | Sample (amount in parts by weight) | | | | | | |
|---|---|---|---|---|---|---|---|
| | B | C | D | E | F | G | H |
| S Red 52 | 0.05 | | | | | | |
| S Yellow 93 | | 0.05 | | | | | |
| S Red 135 | | | 0.05 | | | | |
| S Yellow 98 | | | | 0.03 | 0.03 | | |
| S Green 3 | | | | 0.0015 | 0.0035 | 0.0008 | |
| S Violet 13 | | | | | | 0.005 | 0.005 |
| S Blue 97 | | | | | | | 0.003 |
| O Brightener 184 | | | | | | 0.05 | 0.056 |

Solvent ("S") Red 52, S Red 135, S Yellow 93, S Green 3, S Violet 13, and S Blue 97 are commercially available from Bayer Corporation/Coatings and Colorants Division, Pittsburgh, PA;
S Yellow 98 is commercially available from Clariant Pigments & Additives Division, Sulzbach (Germany);
Optical ("O") Brightener 184 is commercially available from Ciba Specialty Chemicals, Basel (Switzerland);

The formulations were blended and then extruded using a single screw extruder at a melt temperature of 290° C., and pelletized. DVD-9 substrates were molded from the pelletized material after drying in an oven for 4 hours at 120° C. Sumitomo SD30 Molding Machines with Seiko Geikin DVD Molds were used for the molding operation. The substrates (DVD halves) were metallized using a Unaxis Metallizers sputtering system. The bonding operation was performed on a Steag Hamatech Unline 3000 DVD Bonder. Complete electrical testing was completed on AudioDev DVDPro SA300 Pulsetech Drives. Additional physical and mechanical parameters were tested on Dr. Schenk PROmeteus MT136.

A MacBeth Coloreye 7000A spectrophotometer was used to measure the light transmission of the substrates (non-metallized DVD halves) at 650 nm. Table II sets forth the light transmission at 650 nm (expressed in percent transmission (% T)) and the corresponding reflectivity measured on each layer (L0 and L1) by the electrical parameter R14H. [t2]

TABLE II

| Formulation | Disk color | % T @ 650 nm | % R14H/L0 | % R14H/L1 |
|---|---|---|---|---|
| A | Colorless | 90 | 25 | 23 |
| B | Violet | 89 | 24 | 23 |
| C | Yellow | 90 | 25 | 24 |
| D | Red | 90 | 25 | 24 |
| E | Light Green | 83 | 22 | 20 |
| F | Medium Green | 62 | 19 | 18 |
| G | Light Blue | 73 | Unbootable | Unbootable |
| H | Light Blue | 78 | 24 | 16 |

The metallization settings (e.g., resulting in the same thicknesses for L0 and L1) used were the same for formulations A through D since there was no absorption of the light by the color substrate at 650 nm. Gold or silver alloy was used for the semi-reflective data layer (L0) and aluminum was used for the fully reflective data layer (L1). The reflectivity measured by R14H on the colorless (A), violet (B), yellow (C), and red (D) disks, respectively, was on target for all the disks, which demonstrates that colored multi-layered DVD (here DVD-9) can be obtained with the same level of performance as colorless DVD.

For formulations (E) and (F), balanced metallization settings were used between L0 (silver) and L1 (aluminum). Despite the strong absorptivity at 650 nm for formulation (F) (% T equal to 62), a fully functional disk was obtained since both L0 and L1 meet the DVD-Read only specifications (R14H between 18 and 30% and the difference between R14H of L0 and L1's less than 5%). With a substrate having a higher light transmission, i.e., formulation (E) with 83%, reflectivity can even be increased to reach 22% reflectivity on L0 and 20% on L1 enabling consistent production of operable disks.

For formulations (G) and (H), the metallization was not balanced but reflectivity on L0 was maximized in order to reach a value as close as possible to 24% for R14H on L0. This method led to an unbootable disk with formulation (G) and to a disk where L1 was outside the specifications range for formulation (H). It is noteworthy that when a balanced metallization is used, a substrate having only 62% of reflectivity (and therefore a more intense coloration) leads to a fully functional disk within specifications whereas unbalanced metallization in a disk with a light transmission of 73 or even 78% leads to non-functional DVD-9s. These examples are a clear illustration that light transmission by itself does not ensure a fully functional colored multi-layered DVD when the colorants absorb at 650 nm.

It is well known to those skilled in the art that the metallization nature and thickness of a layer have a significant effect on reflectivity. It is therefore possible to compensate for the low transmissivity of a substrate in a single layer DVD system (DVD 5, DVD 10) by increasing the thickness of the metallization and/or the use of an intrinsically more reflective metal. This is not possible in a multi-layered DVD system (DVD 9, DVD 14, DVD 18) because of the presence of a semi-reflective data layer. The semi-reflective data layer both reflects and transmits light so that information present on L0 and L1 can be read.

If current metallization parameters are applied to a disk having a colored substrate, the disk will often be outside of specifications, i.e. the reflectivity of one or both layers is below 18%. Disk manufacturers usually try to address this problem the same way as in CDs or single layered DVDs, i.e. by substantially increasing the metallization thickness on L0 to get a target value of about 24% reflectivity. Unfortunately, this approach often results in non-functional disks or disks that are out of specifications because of the very low reflectivity of L1. The reason why this approach is inherently flawed is that any increase in the metallization of L0 will decrease the reflectivity of L1 because less light goes through L0 and reflects on L1. This explains why L0 and L1 reflectivity are closely related and why both metallizations need to be balanced and not treated independently in a multi-layered DVD system.

By relating the reflectivity of both the fully reflective data layer and the semi-reflective data layer such that the difference in reflectivity between these layers is less than about 5%, and the transmissivity of the layer is at least about 60%, then a colored, functional, multilayered DVD can be obtained.

Production of functional, colored, multi-layered optical disks enables both aesthetic value and increased life. In other words, customized colors can be employed to create a brand identification. Finally, adding colorants to an optical disk can increase the weatherability since some colorants have the ability to "screen" UV light that is known to degrade the mechanical properties of plastics.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An optical disk, comprising:
   a first fully reflective data layer, a first separating layer disposed on a top side of the first fully reflective data layer, a first semi-reflective data layer disposed on a side of the separating layer opposite the first fully reflective data layer, a first resin layer disposed on an upper side the first semi-reflective data layer opposite the separating layer, and a second resin layer disposed on a bottom side of said first fully reflective data layer;
   wherein the first resin layer has light transmission at a desired reading wavelength of greater than 60%;
   wherein a reflectivity of the first fully reflective data layer and the first semi-reflective data layer is individually about 18 to about 30%;
   wherein a difference in the reflectivity between the first fully reflective data layer and the first semi-reflective data layer is less than about 5%; and
   wherein at least a portion of the optical disk is colored.

2. The optical disk according to claim 1, wherein the first resin layer is colored.

3. The optical disk according to claim 1, wherein the first separating layer is colored.

4. The optical disk according to claim 1, wherein the first separating layer comprises a plurality of intermediate layers.

5. The optical disk according to claim 1, wherein said first resin layer and said second resin layer have a thickness of about 0.4 mm to about 1.0 mm.

6. The optical disk according to claim 5, wherein thickness is about 0.5 mm to about 0.7 mm.

7. The optical disk according to claim 1, wherein the difference in reflectivity is less than or equal to about 4%.

8. The optical disk according to claim 7, wherein the difference in reflectivity is about 0.5% to about 3%.

9. The optical disk according to claim 8, wherein the difference in reflectivity is about 1% to about 3%.

10. The optical disk according to claim 1, further comprising a bonding layer disposed on between the first fully reflective data layer and the second resin layer, and a second fully reflective data layer disposed between the bonding layer and the second resin layer, wherein a reflectivity of the second fully reflective data layer is about 45% to about 85%.

11. The optical disk according to claim 10, further comprising a second separating layer disposed between the second fully reflective data layer and the second resin layer, and a second semi-reflective data layer disposed between the second separating layer and the second resin layer;

wherein a difference in the reflectivity between the second fully reflective data layer and the second semi-reflective data layer is less than about 5%; and wherein at least one layer selected from the group consisting of the first separating layer, the first resin layer, the second separating layer and the second resin layer is colored.

12. The optical disk according to claim 1, wherein said colorant is selected from the group consisting of anthraquinones, perylenes, perinones, indanthrones, quinacridones, xanthenes, oxazines, oxazolines, thioxanthenes, indigoids, thioindigoids, naphtalimides, cyanines, xanthenes, methines, lactones, coumarins, bis-benzoxaxolylthiophenes (BBOT), napthalenetetracarboxylic derivatives, monoazo and disazo pigments, triarylmethanes, aminoketones, bis(styryl)biphenyl derivatives, and the like, as well as combinations comprising at least one of the foregoing colorants.

13. A method for making an optical disk, comprising:

disposing a first semi-reflective data layer on a first resin layer, wherein the first resin layer has light transmission at a desired reading wavelength of greater than about 60%;

disposing a top side of a first fully reflective data layer on a side of said first semi-reflective data layer opposite said first resin layer, wherein reflectivity of the first fully reflective data layer and the first semi-reflective data layer is individually about 18% to about 30%, and wherein a difference in the reflectivity between the first fully reflective data layer and the first semi-reflective data layer is less than about 5%;

disposing a separating layer between said first fully reflective data layer and said first semi-reflective data layer;

disposing a second resin layer on a bottom side of said first fully reflective data layer; and adding color to at least a portion of the optical disk.

14. The method according to claim 13, further comprising disposing a bonding layer between the first fully reflective data layer and the second resin layer, and disposing a second fully reflective data layer between the bonding layer and the second resin layer, wherein a reflectivity of the second fully reflective data layer is about 45% to about 85%.

15. The method according to claim 13, further comprising disposing a second separating layer between the second fully reflective data layer and the second resin layer, and disposing a second semi-reflective data layer between the second separating layer and the second resin layer, wherein a difference in reflectivity between the second fully reflective data layer and the second semi-reflective data layer is less than about 5%; and wherein at least one layer selected from the group consisting of the first separating layer, the first resin layer, the second separating layer and the second resin layer is colored.

16. The method according to claim 13, wherein the difference in reflectivity is less than or equal to about 4%.

17. The method according to claim 16, wherein the difference in reflectivity is about 0.5% to about to about 3%.

18. The method according to claim 17, wherein the difference in reflectivity is about 1% to about 3%.

19. The method according to claim 13, wherein adding color comprises adding a colorant to the separator layer, a top coat, the first resin layer, or a combination comprising at least one of the foregoing.

20. The method according to claim 13, wherein said colorant is selected from the group consisting of anthraquinones, perylenes, perinones, indanthrones, quinacridones, xanthenes, oxazines, oxazolines, thioxanthenes, indigoids, thioindigoids, naphtalimides, cyanines, xanthenes, methines, lactones, coumarins, bis-benzoxaxolylthiophenes (BBOT), napthalenetetracarboxylic derivatives, monoazo and disazo pigments, triarylmethanes, aminoketones, bis (styryl)biphenyl derivatives, and the like, as well as combinations comprising at least one of the foregoing colorants.

21. The method according to claim 13, wherein said resin is selected from the group consisting of amorphous thermoplastic, crystalline thermoplastic, semi-crystalline thermoplastic, thermoset, or a combination comprising at least one of the foregoing resins.

22. The method according to claim 21, wherein said resin is selected from the group consisting of polyetherimides, polyetheretherketones, polyimides, polyvinyl chloride, polyolefins, polyesters, polyamides, polysulfones, polyimides, polyether imides, polyether sulfones, polyphenylene sulfides, polyether ketones, polyether ether ketones, ABS resins, polystyrenes, polybutadiene, polyacrylates, polyacrylonitrile, polyacetals, polyphenylene ethers, ethylene-vinyl acetate copolymers, polyvinyl acetate, liquid crystal polymers, ethylene-tetrafluoroethylene copolymer, aromatic polyesters, polyvinyl fluoride, polyvinylidene fluoride, polyvinylidene chloride, tetrafluoroethylene fluorocarbon copolymers, epoxy, phenolic, alkyds, polyester, polyimide, polyurethane, polysiloxanes, polysilanes, bis-maleimides, cyanate esters, vinyl, benzocyclobutene resins, and blends, copolymers, reaction products, and composites comprising at least one of the foregoing resin.

23. The method according to claim 13, wherein said resin comprises polycarbonate.

\* \* \* \* \*